United States Patent
Overcash et al.

(10) Patent No.: US 11,509,498 B1
(45) Date of Patent: Nov. 22, 2022

(54) ACCESS NETWORK CONNECTIVITY OPTIMIZATION ENGINE

(71) Applicant: Cox Communications, Inc., Atlanta, GA (US)

(72) Inventors: Michael Paul Overcash, Duluth, GA (US); Yousef Wasef Nijim, Cumming, GA (US); James Alan Strothmann, Johns Creek, GA (US)

(73) Assignee: Cox Communications, Inc., Atlanta, GA (US)

( * ) Notice: Subject to any disclaimer, the term of this patent is extended or adjusted under 35 U.S.C. 154(b) by 197 days.

(21) Appl. No.: 16/883,490

(22) Filed: May 26, 2020

(51) Int. Cl.
*H04L 12/28* (2006.01)
*G06N 20/00* (2019.01)
*H04L 67/141* (2022.01)

(52) U.S. Cl.
CPC ......... *H04L 12/2856* (2013.01); *G06N 20/00* (2019.01); *H04L 67/141* (2013.01)

(58) Field of Classification Search
CPC ... H04L 12/2856; H04L 41/16; H04L 67/141; G06N 20/00
See application file for complete search history.

(56) References Cited

U.S. PATENT DOCUMENTS

| | | | | |
|---|---|---|---|---|
| 11,140,615 B2 * | 10/2021 | Price | ................... | H04W 48/20 |
| 2004/0114610 A1 * | 6/2004 | Featherston | ........ | H04L 12/2898 370/401 |
| 2014/0280953 A1 * | 9/2014 | Brzozowski | .......... | H04L 69/167 709/226 |
| 2020/0195506 A1 * | 6/2020 | Peng | ..................... | H04W 24/10 |
| 2020/0213400 A1 * | 7/2020 | Van Oort | ................ | H04L 69/40 |
| 2021/0036987 A1 * | 2/2021 | Mishra | ................ | H04L 41/5067 |
| 2021/0112011 A1 * | 4/2021 | K S | ...................... | H04L 41/145 |
| 2021/0211900 A1 * | 7/2021 | Pius | ..................... | H04W 24/08 |
| 2021/0218653 A1 * | 7/2021 | Kannawadi | ......... | H04L 43/0817 |
| 2021/0325948 A1 * | 10/2021 | Lee | ........................ | G06F 1/24 |
| 2021/0360643 A1 * | 11/2021 | Vankayala | ............ | G16Y 10/75 |

* cited by examiner

*Primary Examiner* — Benjamin H Elliott, IV
(74) *Attorney, Agent, or Firm* — Merchant & Gould P.C.

(57) ABSTRACT

Optimized automated access network connectivity is provided. A network connecting device (NCD) may perform an optimized access network setup process upon boot-up to connect to an access network. The optimized process may be determined by a cloud-based machine-learning system based on learned connecting and network usage behaviors. The optimized process may include a sequence of network connectivity evaluations configured to minimize the setup time associated with discovering and connecting to an access network. The optimized process may further reduce or eliminate the probability of device failure due to an erroneous access network implementation by establishing communications with a test server prior to committing an access operating mode to non-volatile memory. The NCD may be configured to modify the device's master configuration settings to include the optimized process such that when a master reset is performed, the device may utilize the optimized process to discover and connect to the access network.

19 Claims, 8 Drawing Sheets

ACCESS NETWORK CONNECTIVITY OPTIMIZATION ENGINE

BACKGROUND

When a network connecting device, such as a gateway router device or access point device, tries to connect to an access network for the first time at the time of installation, after a master reset, or after another settings or memory loss event occurs, settings and data (e.g., a last known connection state, Internet access data) associated with an access network connection may not be known. Accordingly, the device may perform a discovery process for determining a transport method for access network connectivity. Oftentimes, the startup of the network connecting device can be lengthy due at least in part on current access network discovery methods. For example, the network connecting device may be configured to support multiple access networks, and a current discovery method may include a brute force process where the device may automatically attempt to connect via different transport methods linearly, one at a time, until a successful access network is discovered. The discovery process steps can be time-consuming and the connection attempts may not be performed in an optimized order, which may further lengthen the device startup time. Moreover, the automated discovery process may be at risk of a false positive discovery result, where the device may mistakenly identify and implement a non-supported transport method. If the device is not configured correctly, the device may not communicate correctly with a network service provider server, and may be unable to obtain an IP address and may be further unable to access the Internet. In some cases, the result may be an unmanageable device that may require a service call to replace the device.

Accordingly, a technical solution is needed for providing automated access network connectivity that is optimized to minimize the startup time associated with connecting a network connecting device to a network and bringing a customer to service and to reduce or eliminate the probability of device failure due to an erroneous access network implementation.

SUMMARY

Aspects of the present disclosure include a system, apparatus, and method for providing optimized automated access network connectivity. According to an aspect, a network connecting device may include a network connectivity engine operative or configured to perform an automated access network setup process upon boot-up of the device to connect to an access network. In some examples, the access network setup process is an optimized access network setup process determined by a cloud-based optimized connectivity configuration system based on learned connecting and network usage behaviors. The optimized access network setup process may include instructions for performing network connectivity evaluations in a sequence that is optimized to minimize or reduce the setup time associated with discovering and connecting to an access network via an access channel. In some examples, the optimized process and sequence may be further configured to reduce or eliminate the probability of device failure due to an erroneous access network implementation by establishing communications with a designated server prior to committing an access operating mode to non-volatile memory. In some examples, the network connecting device may be configured to modify the device's master configuration settings to include the optimized access network setup process such that when a master reset is performed, the network connecting device may utilize the optimized access network setup process to discover and connect to the access network via a WAN access channel.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the present disclosure.

BRIEF DESCRIPTION OF THE DRAWINGS

Further features, aspects, and advantages of the present disclosure will become better understood by reference to the following figures, wherein like reference numbers indicate like elements throughout the several views.

DETAILED DESCRIPTION

Figure 1:
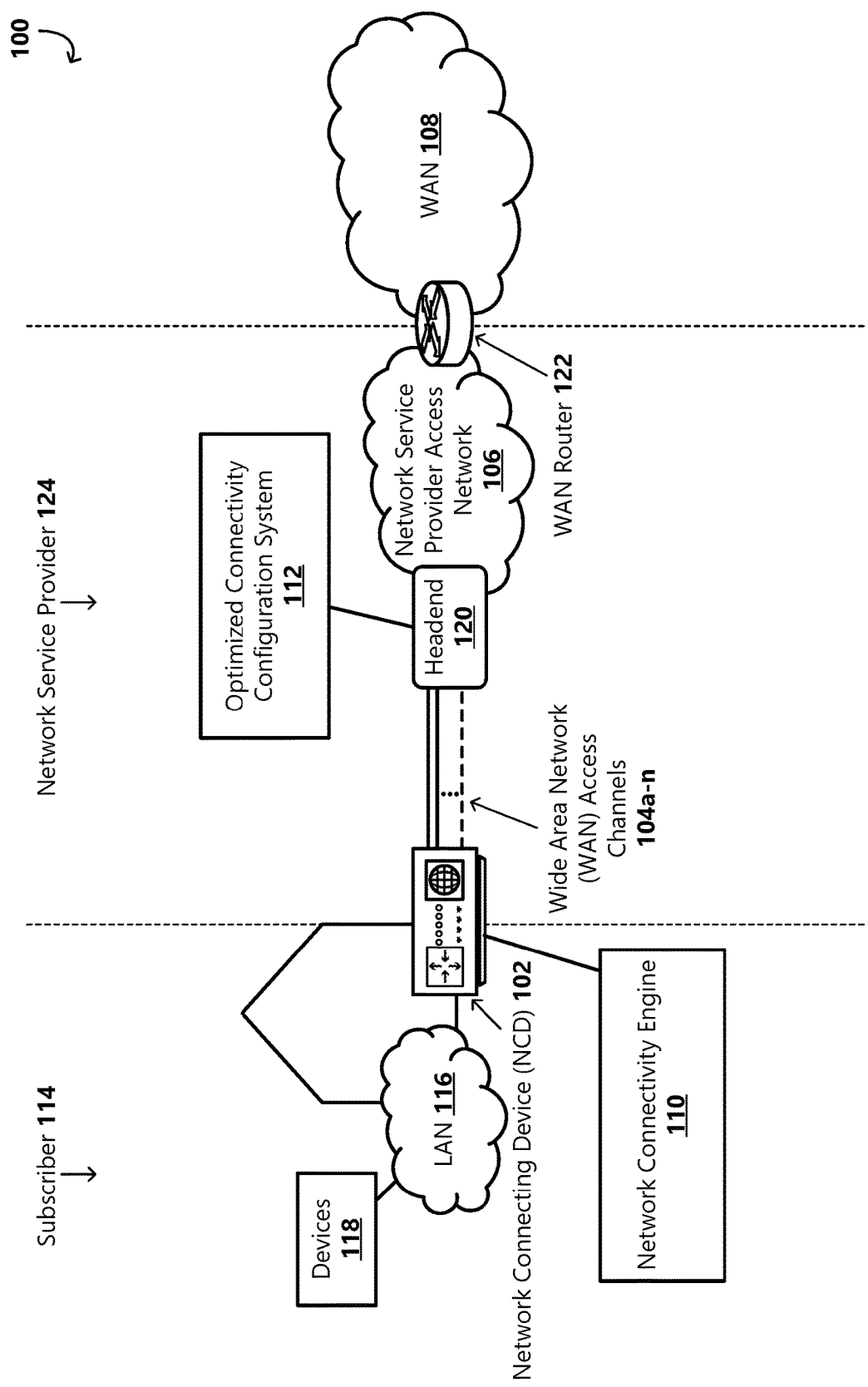
FIG. 1 is a block diagram of an example environment in which a system of the present disclosure can be implemented.

Aspects of the present disclosure reduce the startup time associated with connecting a network connecting device to an access network by providing automated optimized access network connectivity. FIG. 1 is a block diagram of an example environment 100 in which a system of the present disclosure can be implemented. The example environment 100 includes a subscriber network connecting device (NCD) 102, such as a gateway router device or access point device, operative or configured to control data communication on and between an internal subscriber network (i.e., local area network (LAN) 116) and an external network (i.e., wide area network (WAN) 108), such as the Internet. The LAN 116 may be created by the NCD 102 and may include a wired and/or wireless network of connected devices 118a-n (generally 118). Example devices 118 include, but are not limited to, server computers, workstations, set top boxes, desktop computers, laptop computers, tablets, mobile phones, Internet of Things (IoT) devices, smart devices and appliances, gaming devices, printing devices, etc. Further details of the computing devices and variations thereof can be found in FIGS. 5, 6A, 6B, and 7.

The NCD 102 may be configured to connect to access networks 106 provided by one or more network service providers (NSPs) 124 using various wired or wireless WAN access channels 104a-n (generally 104) and transmission methods. As used herein, a WAN access channel 104 includes a logical connection over which information-carrying signals may be transmitted. For example, the NSP 124 may provide infrastructure, a medium, and technologies that enable the NCD 102 to communicate with a headend 120 of the NSP 124 for transmitting and receiving data. The NSP 124 may further provide infrastructure and technologies (e.g., including WAN routers 122) that connect the headend 120 to one or more WANs 108. WAN access channels 104 that connect the NCD 102 to the NSP headend 120 may include the use of one or a combination of coaxial cables, fiber optic cables, telephone lines, Ethernet cables, and radio signals, and may further use particular standards for carrying signals from the headend 120 to the subscriber 114 over a particular medium.

According to an aspect, the NCD 102 may be a multi-WAN device configured to connect to and communicate via more than one WAN access channel 104. For example, the NCD 102 may include a plurality of network interfaces (e.g., a coaxial cable port, a telephone port, an Ethernet port, an ONT (optical network terminal) port, a cellular radio, or other network interface) that enables the NCD 102 to connect to more than one WAN access channel 104. The NCD 102 may be configured with various hardware and software that enable the NCD 102 to modulate carrier signals to encode digital information for transmission via one or more WAN access channels 104 and to demodulate signals received via one or more WAN access channels 104 in order to decode received digital information. The modem software may include instructions and data that configure the NCD 102 to utilize specific hardware and communication protocols for handling data traffic received or transmitted via a specific WAN access channel 104. For example, the various hardware and modem software may enable the NCD 102 to operate as one or more of a DOCSIS® (Data Over Cable Service Interface Specification) modem, a DSL (Direct Subscriber Line) modem, an EWAN (Ethernet Wide Area Network) modem, a fiber optic (Optical Network Terminal (ONT)) modem, an LTE (Long Term Evolution) modem, a MoCA® model, a Wi-Fi® modem (e.g., IEEE802.11), etc.

According to an aspect, the NCD 102 may comprise a network connectivity engine 110 operative or configured to perform an automated access network setup process upon boot-up of the NCD 102 to connect to the NSP access network 106. In some examples, the network connectivity engine 110 is an application included on the platform software and is operative to launch automatically at startup. For example, the network connectivity engine 110 may run prior to existing network activities, such as performing DHCP to obtain an IP address. In some examples, the network connectivity engine 110 may be launched by the platform operating system using a framework that is appropriate (e.g., a Linux® distribution may use a software suite, such as systemd, to launch applications at startup in a controlled and ordered manner).

The access network setup process may be associated with instructions included in the device's master configuration settings. The access network setup process may include a sequence of network connectivity evaluations that may be performed for discovering a WAN access channel 104 and connecting to the WAN 108 via the WAN access channel 104. In some examples, each network connectivity evaluation may be mutually exclusive and may not be able to be performed in parallel.

In some example aspects, when the NCD 102 is connected to the NSP access network 106, the NCD 102 may be configured to communicate with a cloud-based optimized connectivity configuration (OCC) system 112 for receiving instructions associated with an optimized access network setup process determined by the OCC system 112. For example and as will be described in further detail below, the OCC system 112 may be operative or configured to use a machine learning model to determine an optimized access network setup process based on learned connecting and network usage behaviors. The optimized access network setup process may include instructions for performing network connectivity evaluations in a sequence that is optimized to minimize or reduce the setup time associated with discovering and connecting to an access network 106 via a WAN access channel 104. In some examples, a feature for contacting the OCC system 112 may be enabled on the NCD 102 at the time of manufacture or staging, where a method to contact the OCC system 112 may be provisioned and stored in the NCD's non-volatile storage. The NCD 102 may be configured to communicate with the OCC system 112 via a combination of a Uniform Resource Locator (URL), a fully qualified domain name (FQDN), IPv4 address(es), and/or IPv6 address(es).

In some examples, the optimized process and sequence may be further configured to reduce or eliminate the probability of device failure due to an erroneous access network implementation by establishing communications with a test server prior to committing a WAN access operating mode to non-volatile memory. In some examples, the NCD 102 may be configured to modify the NCD's master configuration settings to include the optimized access network setup process such that when a master reset is performed, the NCD 102 may utilize the optimized access network setup process to discover and connect to the WAN 108 via one or more WAN access channels 104.

Figure 2:
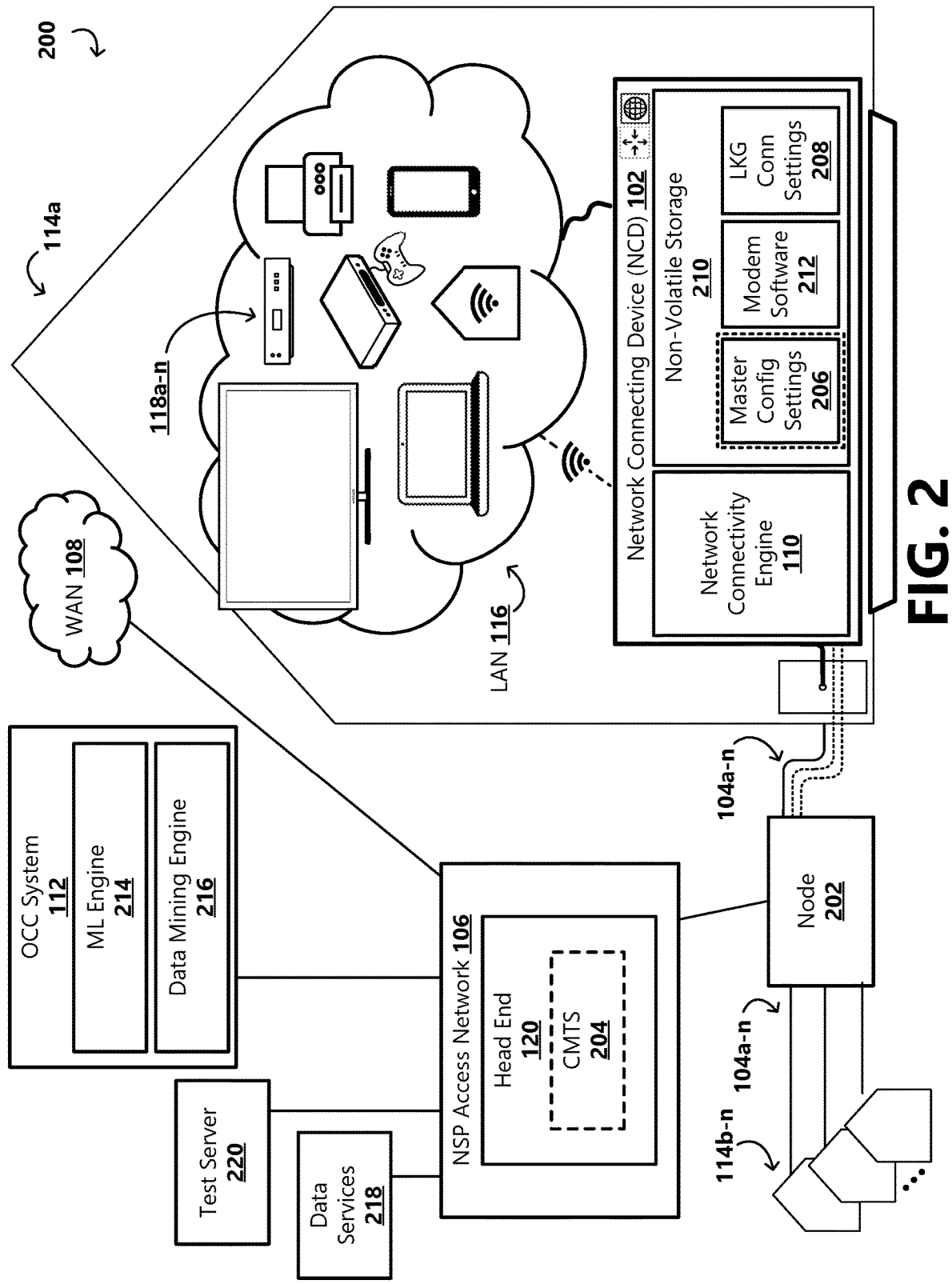
FIG. 2 is another block diagram of an example environment in which a system of the present disclosure can be implemented.

With reference now to FIG. 2, aspects of the OCC system 112 and the network connectivity engine 110 are described in further detail. The example operating environment 200 illustrated in FIG. 2 includes a plurality of subscribers 114a-n connected to an NSP access network 106 via one or more types of WAN access channels 104a-n. One example WAN access channel 104 may include an HFC (Hybrid Fiber Coaxial) network that uses DOCSIS® as a transport method for broadband content. For example, an HFC network may extend from the headend 120 of the NSP 124 to a plurality of nodes 202, where each node serves a plurality of subscribers 114a-n. Each node 202 may serve 200 to 1,000 subscribers within a service area, where the subscribers may subscribe for residential and/or business services.

In some examples, the NSP 124 may use a cable modem termination system (CMTS) 204 located within the headend 120 to provide high speed data services such as cable Internet, among other similar services, to the various sets of subscribers 114a-n. For example, the CMTS 204 may encode, modulate, and upconvert one or more of the services onto radio frequency (RF) carriers, combine the RF carriers into a single electrical signal, and insert the electrical signal into a broadband optical transmitter. The broadband optical transmitter may convert the electrical signal to a downstream optically modulated signal that is sent to one or more of the nodes 202 over one or more fiber optic cable lines.

Each node 202 may include a broadband optical receiver to convert the downstream optically modulated signal to an electrical signal (e.g., translate the signal from a light beam to RF). The node 202 may send the electrical signal over one or more coaxial cable lines to the NCD 102 of a subscriber 114 serviced by the node 202. Each subscriber 114 within a set of subscribers may have at least one NCD 102. In some examples, RF amplifiers may be placed at intervals along the coaxial cables lines to overcome cable attenuation and passive losses of the electrical signal caused by splitting or tapping the coaxial cables lines. Upon receipt of the electrical signal, the NCD 102 may demodulate the electrical signal in order to deliver the services to one or more devices 118a-n of the subscriber 114, including desktop computers, laptop computers, mobile phones, tablets, gaming devices, televisions, among other examples. The HFC network may operate bi-directionally, whereby signals are transmitted in both downstream and upstream directions. For example, downstream signals may transmit data from the headend 120 to the NCD 102 via the respective node 202. The data transmitted in the downstream signals may include content associated with the one or more services being provided, such as video content, voice data, and Internet data, among other examples. The upstream signals may transmit data from the NCD 102 to the headend 120 via the node 202.

In some examples, one or more other WAN access channels 104 may connect the subscribers 114 to the NSP headend 120 (e.g., Ethernet, Wi-Fi®, cellular, microwave, fiber, DSL), and the NCD 102 may be configured to interface the one or more other WAN access channels 104 and to translate data based on the WAN access channel type.

As mentioned above, the NCD 102 may comprise a network connectivity engine 110 operative or configured to perform an automated access network setup process upon boot-up of the NCD 102 to determine a transport method and connect the NCD to the NSP access network 106 via the determined WAN access channel 104. In some examples, such as if the NCD 102 has been previously connected to the WAN 108, the automated access network setup process is performed based on last-known-good connection settings 208 that may be stored in non-volatile storage 210. The last-known-good connection settings 208 may include information about a last-known WAN access channel 104 to the NSP access network 106 and an associated operating mode of the NCD 102. However, when the NCD 102 tries to connect to the WAN 108 for the first time, for example, at the time of installation, after a master reset, or after another settings or memory loss event occurs, settings and data (e.g., a last-known-good connection state, Internet access data) associated with the WAN access channel(s) 104 may not be known. For example, during a master reset or a settings/memory loss event, installed applications and custom settings including last-known-good connection settings 208, modem software 212, user data, etc., may be erased and replaced by the master configuration settings 206 or original software, drivers, and operating system. Accordingly, the network connectivity engine 110 may access master configuration settings 206 and perform the automated access network setup based on the master configuration settings 206.

In some examples, the master configuration settings 206 may include original factory-installed master configuration settings. For example, if the NCD 102 is new, the NCD may use the master configuration settings 206 to boot up and perform the access network setup process for the first time. Or, if a master reset or other settings or memory loss event occurs, the NCD 102 may be restored back to its factory-installed master configuration settings 206, which may be used to boot up and perform the access network setup process to reconnect to the NSP access network 106. In some examples, the master configuration settings 206 may be stored in a hidden partition of the non-volatile storage 210 and may not be erased during a factory/master reset.

According to an example aspect, the master configuration settings 206 may include an optimized access network setup process determined by the OCC system 112, wherein the optimized access network setup process is configured to achieve a better average NCD 102 installation time as compared to an NCD 102 that does not use an optimized access network setup process. For example, the optimized access network setup process may include instructions for performing network connectivity evaluations in a sequence that is optimized to minimize or reduce the setup time associated with discovering and connecting to an access network 106 via a WAN access channel 104. In some examples, the optimized access network setup process may be included in factory-set master configuration settings 206. For example, the OCC system 112 may be configured to collect WAN access channel 104 setup and connectivity information associated with a plurality of NCDs 102 and implement a machine learning algorithm to output a recommended optimized access network setup process for implementation in newly-staged NCDs 102. In other examples, the master configuration settings 206 of an NCD 102 that is in use at a subscriber's premises may be modified such that factory-installed configuration settings may be updated with the optimized access network setup process determined by the OCC system 112. Accordingly, if a factory/master reset is performed on the NCD 102, the boot-up process may use the optimized configuration settings to attempt to establish a WAN connection.

As mentioned previously, the optimized access network setup process is configured to achieve a better average NCD 102 installation time and may include instructions for performing network connectivity evaluations in a sequence that is optimized to minimize or reduce the setup time associated with discovering and connecting to an access network 106 via a WAN access channel 104. In some examples, a determination may be made by the OCC system 112 that ordering the sequence of WAN access channels 104 according to fastest scan times can reduce NCD 102 startup times. Accordingly, in some examples, the sequence included in an optimized access network setup process may evaluate a WAN access channel 104 associated with a fastest scan time first, and if not successful, evaluating a next WAN access channel 104 in the sequence. In example aspects, scan times may be based on empirical data and learned by a machine learning model. For example, performing a scan may be technology-dependent. In one example, a scan for a DOCSIS® link may include: performing automatic gain control (AGC) on a wideband tuner; configuring a demodulator for a single 6 MHZ channel in a channel path; waiting for certain DOCSIS® MAC messages; if found, initiating an upstream ranging process to determine appropriate timing and power levels; if successful, performing additional registration steps; otherwise, configuring the demodulator for a next 6 MHz frequency in the plan; etc. As can be appreciated, there can be 150 or more channels to scan, and the DOCSIS® scan may be a brute force process where the NCD 102 tunes to a channel, determines appropriate timing and power levels, then tunes to another channel, determines appropriate timing and power levels for the other channel, and so on until a successful scan is performed. Accordingly, by performing the fastest WAN access channel 104 scan first and if the associated WAN access channel 104 link is up, this determination can be made quickly and the associated implementation process can be performed promptly to connect to the WAN 108. Further, if the associated WAN access channel 104 link is down, the access network setup method can quickly proceed to the next WAN access channel 104 evaluation in the sequence.

Scan times may be determined based on empirical data including setup and connection information collected and analyzed by the OCC system 112 from a plurality of NCDs 102. According to an aspect, the OCC system 112 may comprise a machine learning engine 214 and a data mining engine 216. For example, the data mining engine 216 may be configured to collect setup and connection data from a plurality of NCDs 102, and the machine learning engine 214 may be configured to apply a machine learning algorithm to the collected data for learning scan times associated with various WAN access channels 104. In some examples, the data collected from an NCD 102 may include, but are not limited to, an elapsed time for each channel search (e.g., DOCSIS® scan took 5 minutes); parameters of successful connections (e.g., DOCSIS® connection established using these channels and at these transmit power levels); a record of successful and unsuccessful attempts to contact the OCC system 112 (e.g., DOCSIS® established but the OCC system 112 could not be reached; PON established and could reach the OCC system 112); timestamps associated with when OCC system 112 connection attempts are made; and information about the NCD 102 itself (e.g., manufacturer, model number, serial number, WAN MAC address, hardware revision, software revision).

The machine learning engine 214 may be further configured to learn characteristics associated with the setups and connections based on the collected data. For example, these characteristics may include information about the type/model of NCD 102, an order of network access channel evaluations performed, a time duration of the evaluations, a result of the evaluations, etc. The machine learning engine 214 may determine an estimated scan time of each WAN access channel 104 associated with a particular NCD 102 based on characteristics of the NCD, a geographical location or region, etc. In one example, a determination may be made that an Ethernet link scan may be a fastest access network connection scan, and based on the determination, the machine learning engine 214 may determine to order the Ethernet channel evaluation first in a sequence included in an optimized access network setup process.

In some examples, a determination may be made by the OCC system 112 that ordering the sequence of WAN access channels 104 according to highest connection success rates can reduce NCD 102 startup times. Accordingly, in some examples, the sequence included in an optimized access network setup process may evaluate the WAN access channel 104 associated with a highest connection success rate first. For example, the connection success rate may be determined based on empirical data including setup and connection data collected and analyzed by the OCC system 112 from a plurality of NCDs 102. According to an aspect, the machine learning engine 214 may be configured to apply a machine learning algorithm to data collected by the data mining engine 216 for learning success rates associated with various WAN access channel 104 connections. In one example, setup and connection data collected and analyzed by the OCC system 112 may include information about each connection attempted, including which ones succeeded and which ones failed. For example, a given NCD 102 may report that it tried DOCSIS® first and couldn't connect, but then tried PON and succeeded. In another example, a CATV network service provider 124 may prevalently use DOCSIS® as a transport method over a HFC network, and thus the connection success rate associated with a DOCSIS® link scan may be relatively high. Accordingly, although the DOCSIS® link scan can be time-consuming to execute, the machine learning engine 214 may determine to order the DOCSIS® channel evaluation first in a sequence included in an optimized access network setup process. In another example, the machine learning engine 214 may be configured to apply a machine learning algorithm to data collected by the data mining engine 216 for learning success rates associated with which DOCSIS® frequencies may be mostly likely to succeed, which may be used to fine tune the search algorithm so that those frequencies are attempted first. In some examples, preferred or excluded frequencies may be configured during factory/warehouse staging of the NCD 102.

In some examples, a determination may be made by the OCC system 112 that ordering the sequence of WAN access channels 104 according to a combination of fastest scan times and highest connection success rates can reduce NCD 102 startup times. For example, the sequence included in an optimized access network setup process may evaluate a WAN access channel 104 associated with a fastest scan time first and a WAN access channel 104 associated with a highest connection success rate next, or vice versa. In other examples, the WAN access channel 104 evaluations included in an optimized sequence of may be ordered according to one or a combination of other connection metrics (e.g., learned by the OCC system 112) that may reduce an average NCD 102 startup time.

In some examples, an optimized access network setup process may include steps to automatically attempt to connect to different WAN access channels 104 according to a determined sequence until a successful access network is discovered. In some examples, a success criterion for determining whether a successful connection is established via a particular WAN access channel 104 includes successful communications with a specified test server 220. In some examples, the test server 220 and method to reach the test server 220 may be specified at the time of manufacture or staging. In some examples, the test server 220 is a cloud-based software download server configured to store and provide software and software updates to NCDs 102. In some examples, the software includes software associated with modem functionality for a particular WAN access channel 104 (e.g., DOCSIS®, Fiber, DSL, cellular, microwave). In other examples, the specified test server 220 may be the OCC system 112 server, a Domain Name System (DNS) server, a Simple Network Management Protocol (SNMP) Manager, a TR-069 Auto Configuration Server (ACS), or other platform chosen by the NSP 124. The NCD 102 may be configured to communicate with the specified test server 220 via a combination of URL, FQDN, IPv4 address(es), IPv6 address(es), or other Layer 3/Layer 4 address. According to an aspect, when a link to the WAN 108 is determined to be up, the network connectivity engine 110 may be configured to attempt to contact the test server 220. If the network connectivity engine 110 is able to successfully communicate with the test server 220, the network connectivity engine 110 may determine that the WAN access channel 104 setup is successful, thus verifying a successful communication with the test server 220. According to an aspect, a verification of success communication with the test server 220 may reduce or eliminate false positive access network connections that can result in NCD 102 failure (e.g., an unmanageable device). For example, an ability to establish a connection with the test server 220 may ensure that the NCD 102 may be able to be remotely controlled and may reduce the likelihood of a service call to restore or configure the NCD 102.

In some examples, the data mining engine 216 may be further configured to collect additional data from one or more other data sources. For example, the data mining engine 216 may communicate with a data services server 218 and collect data associated with trouble calls, field service calls, accounts and billing information, network and device information, location information, etc. The machine learning engine 214 may analyze the collected data to learn connecting and network usage behaviors of the NCD 102 and of neighboring NCDs, device 118 behaviors, node 202 conditions, network performance, connectivity to the headend 120, etc. One example learning may be that one WAN access channel 104 may have a higher connection success rate in a particular market area or geographical region. For example, the machine learning engine 214 may analyze collected data and learn a correlation between higher connection success rates of DOCSIS® and Northeast markets, a correlation between higher connection success rates of PON and Southwest markets, etc. In some examples, the learned information may be used as part of determining an optimized sequence and access network setup process for an NCD 102. Further, in some examples, these learned correlations may be used to influence staging practices in different markets (i.e. some staging facilities would stage to prefer DOCSIS®, and others to prefer PON based on where they are physically located.)

In other examples, the learned information may be used as part of determining optimized connectivity settings for optimized delivery of content. In some examples, the optimized connectivity settings may be used by the NCD 102 to control the transmissions of data using particular WAN access channels 104 based on capabilities of the NCD 102, network conditions and connectivity, and learned connecting and usage behaviors of the NCD and of devices 118 at the subscriber premises. For example, the optimized connectivity settings may include instructions associated with controlling the routing and prioritization of traffic using various WAN access channels 104 to optimize performance (e.g., download speed, upload speed, signal strength, bandwidth usage). In some examples, the optimized connectivity settings may be configured to use a plurality of WAN access channels 104 for bandwidth management, policy routing, or other traffic controlling function for optimized performance or according to business rules. For example, bandwidth management may be used to guarantee and/or limit bandwidth usage by device 118, schedule, Quality of Service (QoS) code, network application, etc. In some examples, bandwidth management may be used to create traffic priority settings.

As one example, the machine learning engine 214 may learn that an NCD 102 may be operative as an ONT modem and that at least one WAN access channel 104 to the subscriber premises is a fiber optic cable line. Based on an analysis of collected NCD and network data, the machine learning engine 214 may learn that a significant amount of data traffic to/from the subscriber 114 includes VoIP (Voice over Internet Protocol) communications, which may rely on a high quality and stable connection. The machine learning engine 214 may further learn that a fiber optic WAN access channel 104 may provide a highest performing WAN access channel 104 (e.g., high bandwidth, fast download and upload speeds, high signal strength, minimal network congestion, low latency). Based on this learned information, the machine learning engine 214 may determine optimized connectivity settings for optimized delivery of content includes using the fiber optic channel for at least a portion of data traffic (e.g., VoIP data).

As another example, multiple WAN access channels 104 may be established; however not all of them may allow communication to the NSP access network 106 (e.g., have unsuccessful communications with the test server 220). This connection information may be provided to the machine learning engine 214, which may learn that certain WAN access channels 104 may be unsuitable. Based on this learned information, the machine learning engine 214 may determine optimized connectivity settings for optimized delivery of content includes excluding these certain WAN access channels 104 from an optimized sequence of network connectivity evaluations that may be performed for discovering a WAN access channel 104.

In some examples, the optimized connectivity settings determined by the OCC system 112 may be sent over an active WAN access channel 104 to the NCD 102 and stored in non-volatile storage 210 on the NCD. In some examples, the optimized connectivity settings may overwrite master configuration settings 206. For example, the NCD 102 may use the optimized connectivity settings to use a particular WAN access channel 104 to connect to the NSP access network 106 and to the WAN 108. In some examples, the NCD 102 may be instructed to download modem software 212 associated with a particular WAN access channel 104 from the test server 220 based on the determined optimized connectivity settings. As should be understood by those skilled in the art, one or more of the components included in the OCC system 112 can be integrated or provided in any combination of separate systems, wherein FIG. 2 shows only one example.

Figure 3:
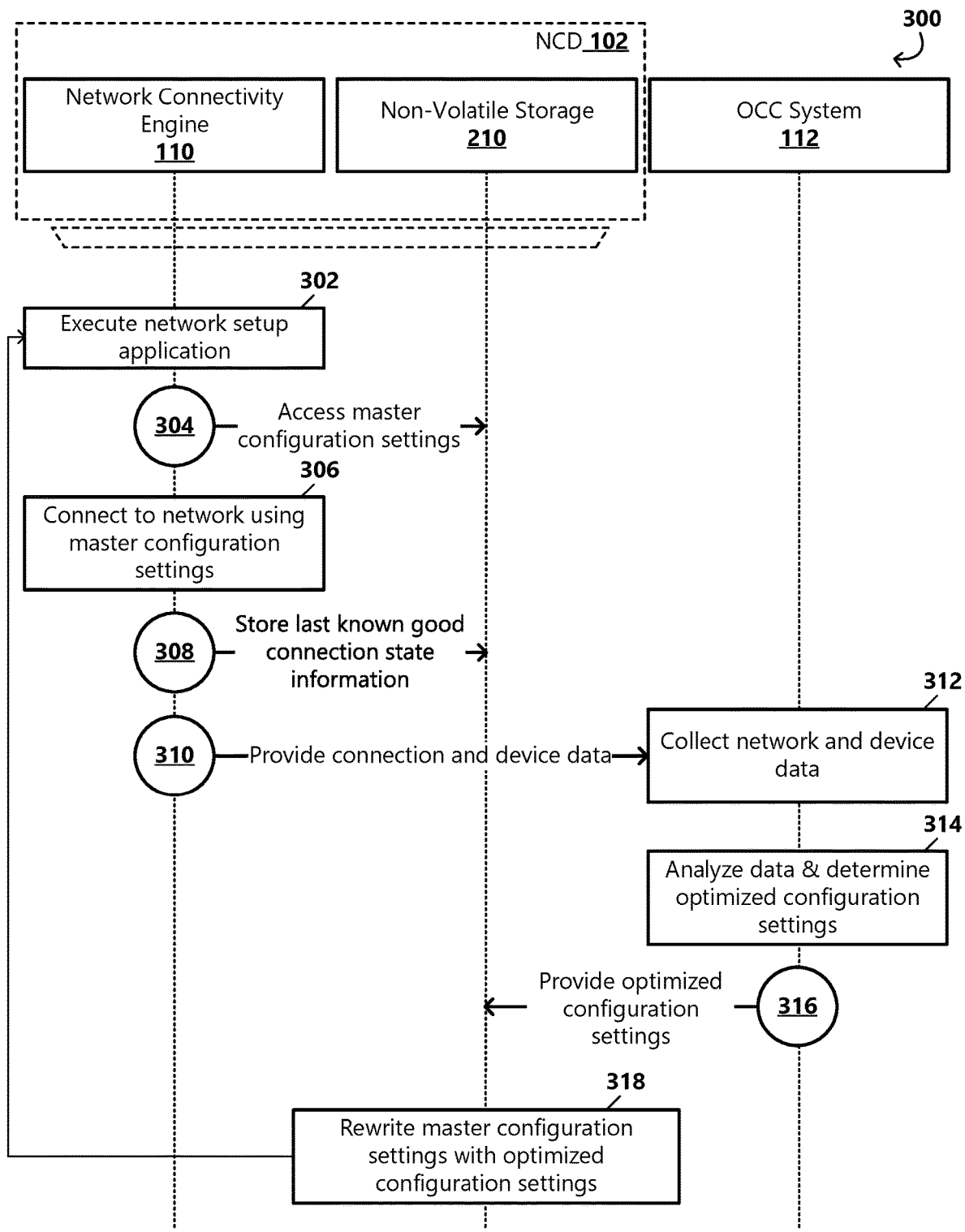
FIG. 3 is a message flow diagram that illustrates an example message flow between components as part of providing optimized access network connectivity.

FIG. 3 includes a message flow diagram that illustrates an example message flow 300 between components as part of providing optimized WAN access channel settings for minimizing the time associated with discovering and connecting to the WAN 108 via a WAN access channel 104 and/or for improving connectivity performance (e.g., less bandwidth usage, faster download and/or upload speeds, high signal strength, minimal network congestion, low latency). With reference now to FIG. 3, at OPERATION 302, the NCD 102 may execute an access network setup process for discovering a WAN access channel 104 and connecting to the WAN 108 via the WAN access channel 104. For example, the access network setup process may be executed when the NCD 102 tries to connect to an access network for the first time at the time of installation, after a master reset, or after another settings or memory loss event occurs. Instructions associated with the access network setup process may be included in the master configuration settings 206 stored in the NCD's non-volatile storage 210 and may include a sequence of network connectivity evaluations that may be performed for discovering a WAN access channel 104 and connecting to the WAN 108 via the WAN access channel 104. According to an aspect, the master configuration settings 206 may be factory-set or may be optimized. COMMUNICATION 304 represents the network connectivity engine 110 retrieving the master configuration settings 206 and OPERATION 306 represents the network connectivity engine 110 performing the access network setup process based on the master configuration settings 206 to connect the NCD 102 and the associated LAN 116 to the WAN 108 via a linked WAN access channel 104.

After a success connection to the test server 220, COMMUNICATION 308 represents the network connectivity engine 110 storing the WAN access channel 104 information as a last-known-good connection state in the non-volatile storage 210. The parameters/data included in last-known-good connection state information may vary by WAN technology. For example, for DOCSIS, the last-known-good connection state information may include downstream frequency and modulation of primary downstream, upstream frequency, and power level of transmitter. For Ethernet, the last-known-good connection state information may include an information that an EWAN connection was successfully established, and in some examples, a last-known-good VLAN tag or 802.1X authentication credential.

COMMUNICATION 310 represents the network connectivity engine 110 providing data to the data mining engine 216 and OPERATION 312 represents the data mining engine 216 of the OCC system 112 collecting data associated with results of the access network setup process performed by the NCD 102, data associated with the NCD 102 and devices connected to the NCD, network performance data associated with the NCD's connection to the headend 120 via the WAN access channel 104, etc.

OPERATION 314 represents the machine learning engine 214 of the OCC system 112 analyzing the collected data, learning device and connectivity behaviors, and determining optimized WAN access channel settings. In some examples, the optimized WAN access channel settings may be configured to minimize the time associated with discovering and connecting to the WAN 108 via a WAN access channel 104. In other examples, the optimized WAN access channel settings may be configured to improve connectivity performance (e.g., less bandwidth usage, faster download and/or upload speeds, high signal strength, minimal network congestion, low latency). COMMUNICATION 316 represents the OCC system 112 providing the optimized WAN access channel settings to the NCD 102, which may be stored in the device's non-volatile storage 210 and may overwrite the stored master configuration settings with optimized configuration settings based on the optimized WAN access channel settings. In some examples, such as when the optimized configuration settings include an optimized access network setup process determined by the OCC system 112, upon the next master reset and startup of the NCD 102, the network connectivity engine 110 may access the optimized master configuration settings 304 and use the optimized settings to discover a WAN access channel 104 and connect to the WAN 108 via the WAN access channel 104. For example, by using the optimized settings, the NCD 102 may connect to the WAN 108 more quickly and complete the setup process in less time than an NCD that is not configured to use optimized settings to connect to the WAN.

Figure 4A:
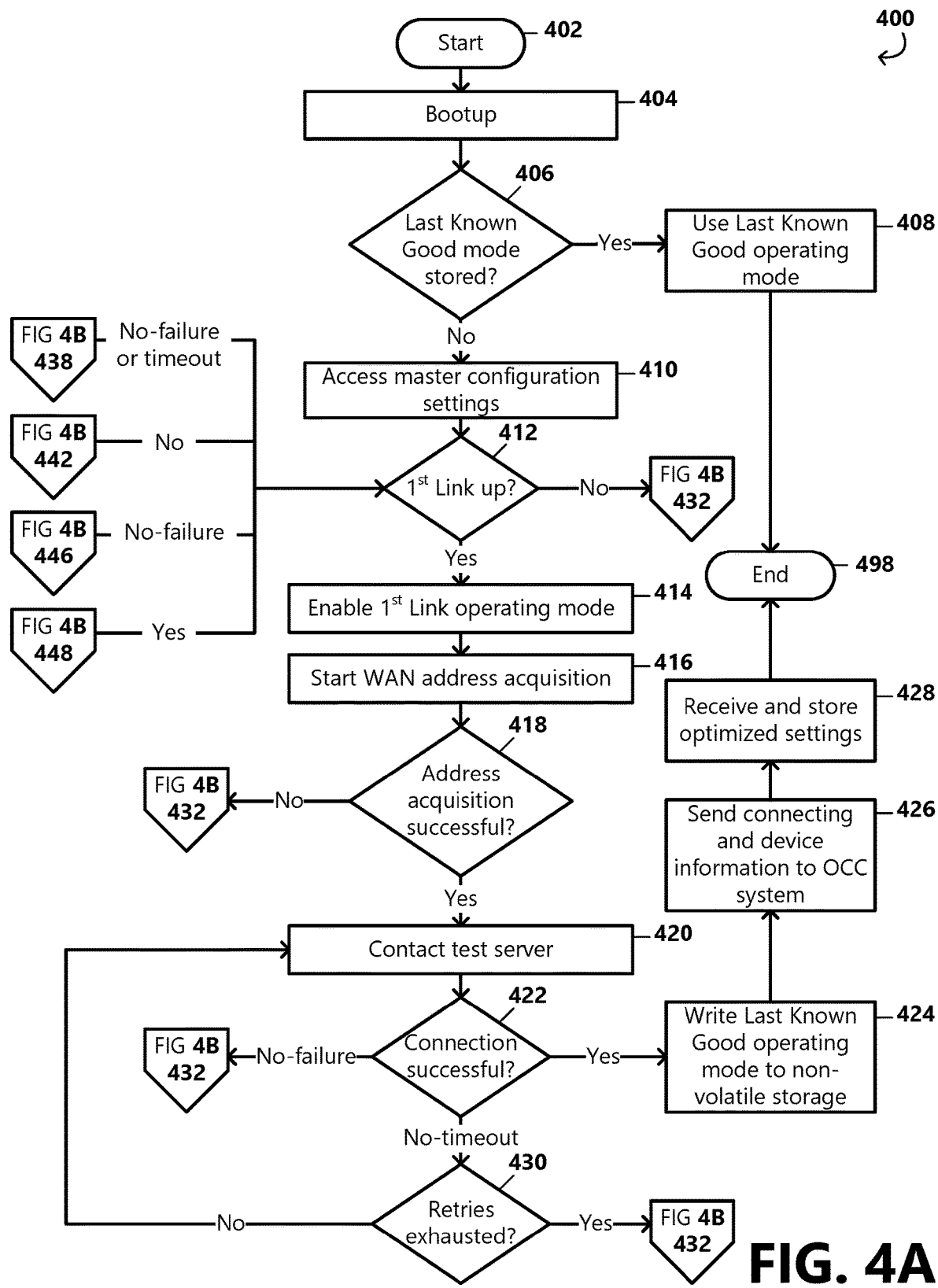
FIGS. 4A-B are a flow diagram depicting stages of an example process for providing optimized access network connectivity according to an embodiment.
Figure 4B:
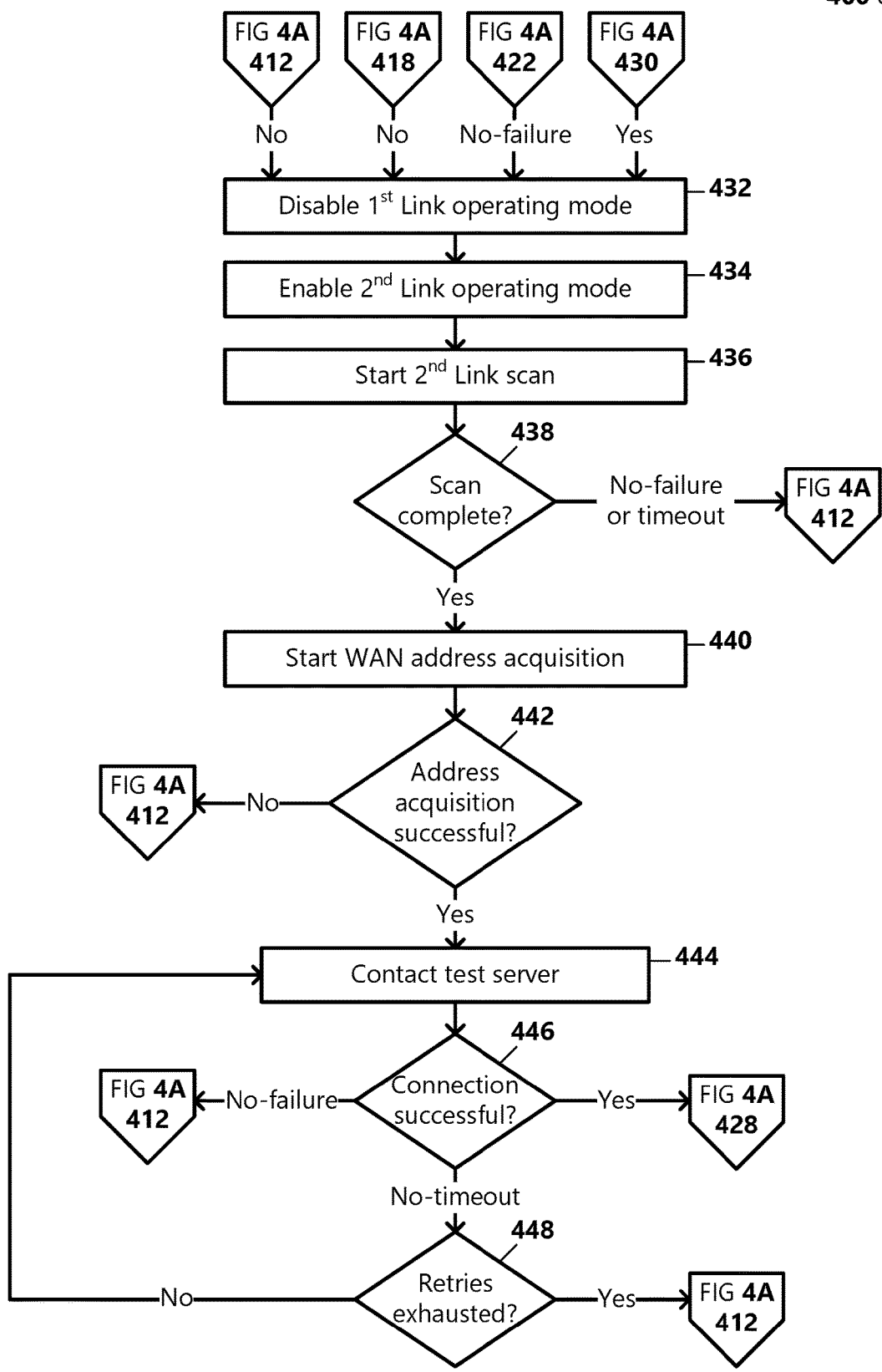

FIGS. 4A-B is a flow chart depicting general stages of an example process or method 400 for performing an optimized access network setup process. With reference now to FIG. 4A, the method 400 starts at START OPERATION 402, which may be at power up of the NCD 102, and proceeds to OPERATION 404, where a boot-up process may be initiated to connect the NCD 102 to the NSP access network 106. In some examples, the boot-up process may be initiated at the time of installation or after a master reset or other settings or memory loss event occurs.

At DECISION OPERATION 406, a determination may be made by the network connectivity engine 110 as to whether last-known-good connection settings 208 are known. For example, the last-known-good connection settings 208 may include last-known-good WAN access channel 104 information and may be stored in non-volatile storage 210. If last-known-good connection mode information is stored, the method 400 may proceed to OPERATION 408, where the last-known-good WAN access channel 104 information may be used to connect the NCD 102 to the NSP access network 106 via the WAN access channel 104.

If last-known-good connection mode information is not stored, the method 400 may proceed to OPERATION 410, where the master configuration settings may be accessed from a hidden partition of the non-volatile storage 210. For example, the master configuration settings may include an optimized access network setup process determined by the OCC system 112.

At DECISION OPERATION 312 a determination may be made by the network connectivity engine 110 as to whether a first WAN access channel 104 link is up. The first WAN access channel 104 may be associated with a first network connectivity evaluation of an optimized sequence of network connectivity evaluations. In some examples, the optimized sequence is determined by the machine learning engine 214 to minimize the average WAN connection time. In some examples, the first WAN access channel 104 may be associated with a fastest scan time. In some examples, an Ethernet scan may be determined to have a fastest scan time. If the first WAN access channel 104 link is not up, the method 400 may proceed to OPERATION 428 in FIG. 4B to perform a second network connectivity evaluation of the optimized sequence, which will be described below.

If the first WAN access channel 104 link is determined to be up, the method 400 may proceed to OPERATION 414, where the operating mode associated with the first WAN access channel 104 may be enabled, and at OPERATION 416, a WAN address acquisition may be performed. For example, the NCD 102 may attempt use the first WAN access channel 104 to connect with a NSP server using a Dynamic Host Configuration Protocol (DHCP) to acquire an IP address from the NSP 124.

At DECISION OPERATION 418, a determination may be made by the network connectivity engine 110 as to whether an IP address is successfully acquired. In some examples, success may be defined as achieving IPv4 or IPv6 connectivity. In some examples, if only a single mode is established, acquisition for the other mode may continue in the background. If an IP address is not successfully acquired (e.g., if the link goes down or if address acquisition times out), the method 400 may proceed to OPERATION 428 in FIG. 4B to perform the second network connectivity evaluation of the optimized sequence, which will be described below.

If an IP address is successfully acquired, the method 400 may proceed to OPERATION 420, where download information may be requested from a test server 220. In some examples, OPERATION 420 may be performed to determine whether the first WAN access channel 104 is a connection to a usable access network 106. For example, an available Ethernet link and an acquired IP address may not guarantee that the connected network is an access network 106. That is, in some cases, a user may plug a network router or other device into the WAN port of the NCD 102, which may appear as a successful connection, but may be a false positive discovery result. A successful connection with the test server 220 may be used as a verification that the first WAN access channel 104 is connected to a usable access network 106. In some examples, a successful connection with the test server 220 may be further used as a verification that the NCD 102 is able to connect with a NSP server and can likely recover from an incorrect configuration. For example, without implementation of the test server 220 connection verification, if the NCD 102 is configured incorrectly, it may be unable to access the NSP headend 120 nor the WAN 108. In some cases, the NCD 102 may become an unmanageable device that may require a service call to reconfigure or replace the device.

At DECISION OPERATION 422, a determination may be made by the network connectivity engine 110 as to whether the NCD 102 is able to successfully communicate with the test server 220. If the NCD 102 is able to successfully connect to the test server 220 and request download information, the method 400 may proceed to OPERATION 424, where connection information to the NSP access network 106 via the first WAN access channel 104 may be stored as last-known-good operating mode settings in non-volatile storage 210. For example, successful connection results associated the first network connectivity evaluation may be stored such that a subsequent boot-up process may be enabled to use the stored settings and avoid subsequent scans for a faster NCD 102 startup time.

At OPERATION 426, data associated with the network connectivity evaluation(s), device information, and network usage may be transmitted to the OCC system 112. For example, the OCC system 112 may use a machine learning model to determine an optimized access network setup process and associated optimized master configuration settings based on learned connecting and network usage behaviors that minimizes or reduces the setup time associated with discovering and connecting to the NSP access network 106. At OPERATION 428, the NCD 102 may receive and store the optimized the master configuration settings. For example, the optimized master configuration settings may overwrite factory-installed master configuration settings 206 stored on the NCD 102, and may minimize or reduce the setup time associated with discovering and connecting to the NSP access network 106 via a WAN access channel 104.

If connection to the test server 220 is determined to be unsuccessful due to a timeout, the method 400 may proceed to DECISION OPERATION 430, where a determination may be made as to whether the retries are exhausted. If the retries are not exhausted, the method 400 may return to OPERATION 420. For example, multiple IPv4 and/or IPv6 addresses may be available. If available, a new server address may be used on each attempt, and the retries may be exhausted before all servers are attempted. If the retries are exhausted or if a connection failure (e.g., a DNS error or an HTTP 404 error) is determined by the network connectivity engine 110 at DECISION OPERATION 422, the method 400 may proceed to OPERATION 432 in FIG. 4B to perform the second network connectivity evaluation of the optimized sequence. For example, certain error criteria may trigger a fast exit that may be intelligently constructed to prevent retrying an operation over and over that is unlikely to succeed on subsequent attempts.

The method 400 continues to FIG. 4B. With reference now to FIG. 4B, at OPERATION 432, the operating mode associated with the first WAN access channel 104 may be disabled, and the operating mode associated with a second WAN access channel 104 may be enabled. For example, the second WAN access channel 104 may be associated with a second network connectivity evaluation of the optimized sequence of network connectivity evaluations. In some examples, the second network connectivity evaluation may be associated with evaluating a DOCSIS® channel. At OPERATION 436, a scan of the second WAN access channel 104 link may be performed.

At DECISION OPERATION 438, a determination may be made by the network connectivity engine 110 as to whether the scan is complete. If a failure or timeout is determined, the method 400 may return to OPERATION 412 of FIG. 4A, where the first WAN access channel 104 link may be rescanned. If the second WAN access channel 104 link scan is determined, the method 400 may proceed to OPERATION 440, where a WAN address acquisition may be performed. For example, the NCD 102 may attempt use the second WAN access channel 104 to connect with a NSP server using DHCP to acquire an IP address from the NSP 124.

At DECISION OPERATION 442, a determination may be made by the network connectivity engine 110 as to whether an IP address is successfully acquired. In some examples, success may be defined as achieving IPv4 or IPv6 connectivity. In some examples, if only a single mode is established, acquisition for the other mode may continue in the background. If an IP address is not successfully acquired (e.g., if the link goes down or if address acquisition times out), the method 400 may return to OPERATION 412 in FIG. 4A where the first WAN access channel 104 link may be rescanned.

If an IP address is successfully acquired, the method 400 may proceed to OPERATION 444, where download information may be requested from the test server 220. In some examples, OPERATION 444 may be performed to determine whether the second WAN access channel 104 is a connection to a usable access network 106. For example, a successful connection with the test server 220 may be used as a verification that the second WAN access channel 104 is connected to a usable access network 106.

At DECISION OPERATION 446, a determination may be made by the network connectivity engine 110 as to whether the NCD 102 is able to successfully communicate with the test server 220. If the NCD 102 is able to successfully connect to the test server 220 and request download information, the method 400 may proceed to OPERATION 424 of FIG. 4A, where connection information to the NSP access network 106 via the second WAN access channel 104 may be stored as last-known-good operating mode settings in non-volatile storage 210, connecting data may be sent to the OCC system 112 (OPERATION 426), and optimized master configuration settings may be received and stored (OPERATION 428).

If, at DECISION OPERATION 446, a connection to the test server 220 is determined to be unsuccessful due to a timeout, the method 400 may proceed to DECISION OPERATION 448, where a determination may be made as to whether the retries are exhausted. If the retries are not exhausted, the method 400 may return to OPERATION 444. For example, multiple IPv4 and/or IPv6 addresses may be available. If available, a new server address may be used on each attempt, and the retries may be exhausted before all servers are attempted. If the retries are exhausted (e.g., a retry limit has been reached) or if a connection failure (e.g., a DNS error or an HTTP 404 error) is determined at DECISION OPERATION 446, the method 400 may return to OPERATION 412 in FIG. 4A to retry the first network connectivity evaluation of the optimized sequence. The method may end at END OPERATION 498.

Figure 5:
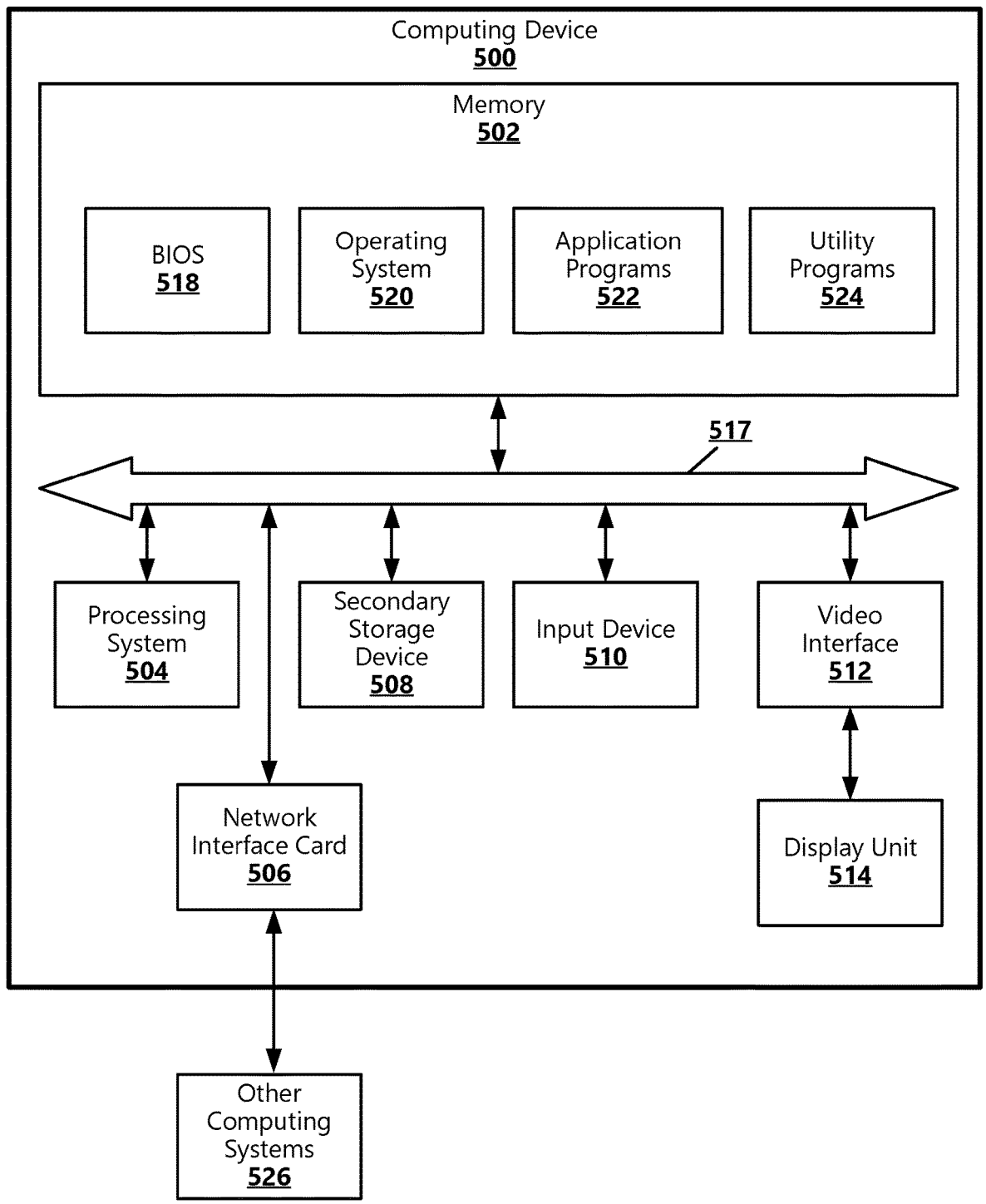
FIG. 5 is a block diagram illustrating example physical components of a computing device or system with which embodiments may be practiced.

FIG. 5 is a block diagram illustrating example physical components of a computing device 500 or system with which embodiments may be practiced. It should be appreciated that in other embodiments, different hardware components other than those illustrated in the example of FIG. 5 may be used. Computing devices may be implemented in different ways in different embodiments. For instance, in the example of FIG. 5, the computing device 500 includes a processing system 504, memory 502, a network interface card 506 (wired and/or wireless), a secondary storage device 508, an input device 510, a video interface 512, a display unit 514, and a communication medium 517. In other embodiments, the computing device 500 may be implemented using more or fewer hardware components (e.g., a video interface, a display unit, or an input device) or in combination with other types of computer systems 526 and program modules.

The memory 502 includes one or more computer-readable storage media capable of storing data and/or computer-executable instructions. Memory 502 may store the computer-executable instructions that, when executed by a processor or processing unit of the processing system 504, cause operations, such as the operations described above with respect to FIGS. 3, 4A, and 4B) to provide automated optimized access network connectivity. In various embodiments, the memory 502 is implemented in various ways. For example, the memory 502 can be implemented as various types of computer-readable storage media. Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices and/or articles of manufacture that store data.

The term computer-readable storage medium may also refer to devices or articles of manufacture that store data and/or computer-executable instructions readable by a computing device. The term computer-readable storage media encompasses volatile and non-volatile, removable and non-removable media implemented in various methods or technologies for storage and retrieval of information. Such information can include data structures, program modules, computer-executable instructions, or other data.

The processing system 504 includes one or more processing units (e.g., one or more processors), which may include tangible integrated circuits that selectively execute computer-executable instructions. In various embodiments, the processing units in the processing system 504 are implemented in various ways. For example, the processing units in the processing system 504 can be implemented as one or more processing cores. In this example, the processing system 504 can comprise one or more microprocessors. In another example, the processing system 504 can comprise one or more separate microprocessors. In yet another example embodiment, the processing system 504 can comprise Application-Specific Integrated Circuits (ASICs) that provide specific functionality. In yet another example, the processing system 504 provides specific functionality by using an ASIC and by executing computer-executable instructions.

The computing device 500 may be enabled to send data to and receive data from a communication network via a network interface card 506. In different embodiments, the network interface card 506 is implemented in different ways, such as an Ethernet interface, a token-ring network interface, a fiber optic network interface, a wireless network interface (e.g., WIFI, Wi-Max, etc.), or another type of network interface. The network interface may allow the device to communicate with other devices, such as over a wireless network in a distributed computing environment, a satellite link, a cellular link, and comparable mechanisms. Other devices may include computer device(s) that execute communication applications, storage servers, and comparable devices.

The secondary storage device 508 includes one or more computer-readable storage media, and may store data and computer-executable instructions not directly accessible by the processing system 504. That is, the processing system 504 performs an I/O operation to retrieve data and/or computer-executable instructions from the secondary storage device 508. In various embodiments, the secondary storage device 508 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 510 enables the computing device 500 to receive input from a user. Example types of input devices include, but are not limited to, keyboards, mice, trackballs, stylus input devices, key pads, microphones, joysticks, touch-sensitive display screens, and other types of devices that provide user input to the computing device 500.

The video interface 512 outputs video information to the display unit 514. In different embodiments, the video interface 512 is implemented in different ways. For example, the video interface 512 is a video expansion card. In another example, the video interface 512 is integrated into a motherboard of the computing device 500. In various embodiments, the display unit 514 can be an LCD display panel, a touch-sensitive display panel, an LED screen, a projector, a cathode-ray tube display, or another type of display unit. In various embodiments, the video interface 512 communicates with the display unit 514 in various ways. For example, the video interface 512 can communicate with the display unit 514 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 517 facilitates communication among the hardware components of the computing device 500. In different embodiments, the communications medium 517 facilitates communication among different components of the computing device 500. For instance, in the example of FIG. 5, the communications medium 517 facilitates communication among the memory 502, the processing system 504, the network interface card 506, the secondary storage device 508, the input device 510, and the video interface 512. In different embodiments, the communications medium 517 is implemented in different ways, such as a PCI bus, a PCI Express bus, an accelerated graphics port (AGP) bus, an InfiniBand® interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 502 stores various types of data and/or software instructions. For instance, in the example of FIG. 5, the memory 502 stores a Basic Input/Output System (BIOS) 518, and an operating system 520. The BIOS 518 includes a set of software instructions that, when executed by the processing system 504, cause the computing device 500 to boot up. The operating system 520 includes a set of software instructions that, when executed by the processing system 504, cause the computing device 500 to provide an operating system that coordinates the activities and sharing of resources of the computing device 500. The memory 502 also stores one or more application programs or program code 522 that, when executed by the processing system 504, cause the computing device 500 to provide applications to users. The memory 502 also stores one or more utility programs 524 that, when executed by the processing system 504, cause the computing device 500 to provide utilities to other software programs.

Embodiments may be used in combination with any number of computer systems, such as in server environments, desktop environments, laptop or notebook computer systems, multiprocessor systems, micro-processor based or programmable consumer electronics, networked PCs, mini computers, main frame computers and the like. Embodiments may be utilized in various distributed computing environments where tasks are performed by remote processing devices that are linked through a communications network in a distributed computing environment, and where program code may be located in local and/or remote memory storage (e.g., memory and/or disk(s)).

All system components described herein may be communicatively coupled via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPoE), MoCA®, VLAN, 802.1X authentication, WiFi®, etc. including any combination thereof.

Figure 6:
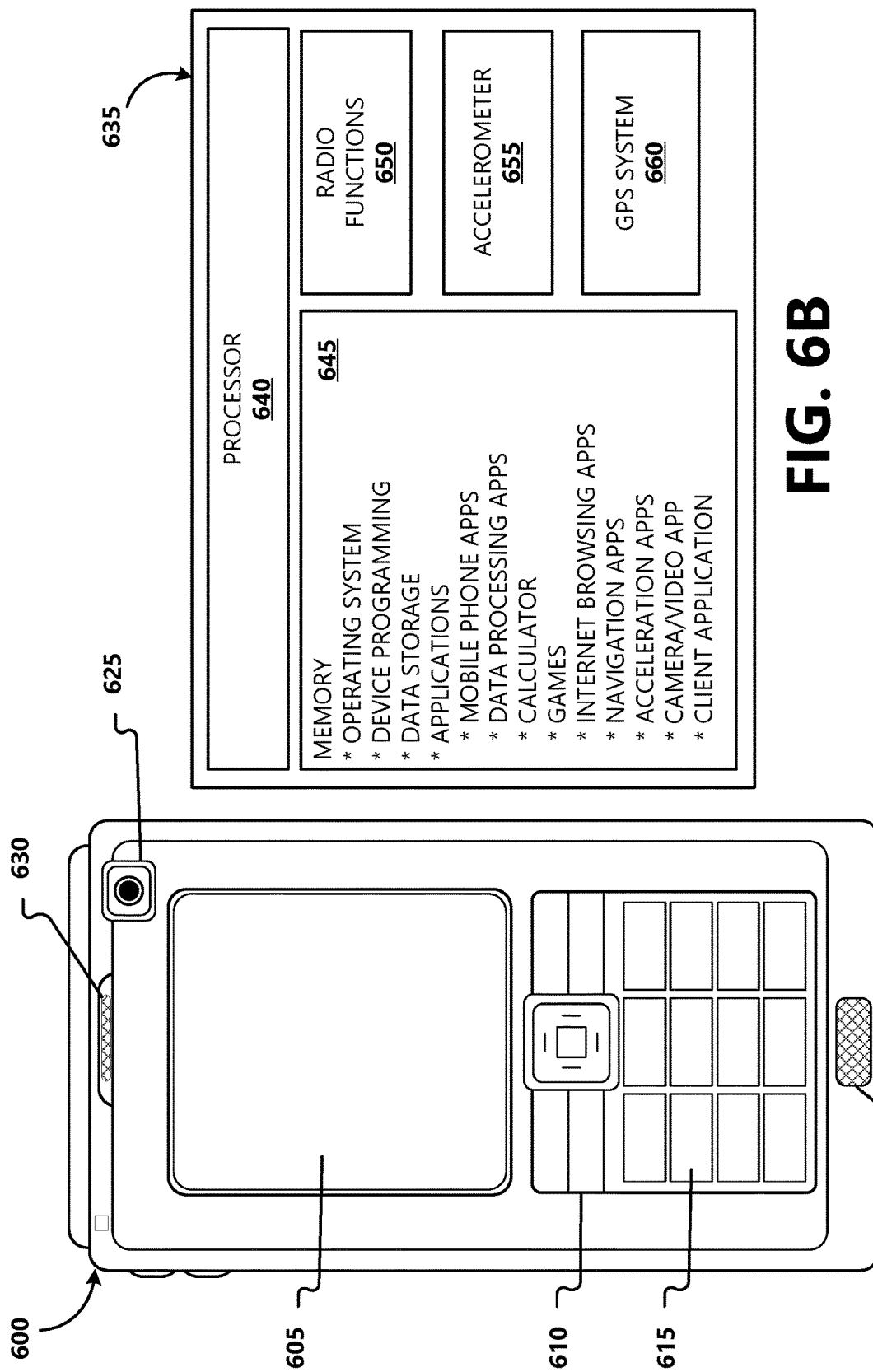
FIGS. 6A and 6B are block diagrams illustrating example physical components of a suitable mobile computing environment with which aspects of the present disclosure can be practiced.

FIGS. 6A-6B illustrate a suitable mobile computing device 600 or environment, for example, a mobile computing device or smart phone, a tablet personal computer, a laptop computer, or other client device with which aspects can be practiced. The mobile computing device 600 is illustrative of any suitable device operative to send, receive and process wireless communications. Referring now to FIG. 6A, a display screen 605 is operative for displaying a variety of information such as information about incoming and outgoing communications, as well as, a variety of data and displayable objects, for example, text, alphanumeric data, photographs, and the like.

Data input to the mobile computing device 600 can be performed via a variety of suitable means, such as, touch screen input via the display screen 605, keyboard or keypad input via a data entry area 610, key input via one or more selectable buttons or controls 615, voice input via a microphone 618 disposed on the mobile computing device 600, photographic input via a camera 625 functionality associated with the mobile computing device 600, or any other suitable input means. Data can be output via the mobile computing device 600 via any suitable output means, including but not limited to, display on the display screen 605, audible output via an associated speaker 630 or connected earphone system, vibration module for providing tactile output, and the like.

Referring now to FIG. 6B, operational unit 635 is illustrative of internal operating functionality of the mobile computing device 600. A processor 640 is illustrative of a computer processor for processing incoming and outgoing data and communications and controlling operation of the device and associated software applications via a mobile computing device operating system. Memory 645 can be utilized for storing a device operating system, device programming, one or more stored applications, for example, mobile telephone applications, data processing applications, calculators, games, Internet browsing applications, navigation applications, acceleration applications, camera and/or video applications, etc.

Mobile computing device 600 can contain an accelerometer 655 for detecting acceleration, and can be used to sense orientation, vibration, and/or shock. Mobile computing device 600 can contain a global positioning system (GPS) system (e.g., GPS send/receive functionality) 660. A GPS system 660 uses radio waves to communicate with satellites orbiting the Earth. Some GPS-enabled mobile computing devices use wireless-assisted GPS to determine a user's location, wherein the device uses orbiting GPS satellites in conjunction with information about the device's mobile phone signal. Radio functions 650 include all required functionality, including onboard antennae, for allowing the mobile computing device 600 to communicate with other communication devices and systems via a wireless network. Radio functions 650 can be utilized to communicate with a wireless or WIFI-based positioning system to determine a device location.

Figure 7:
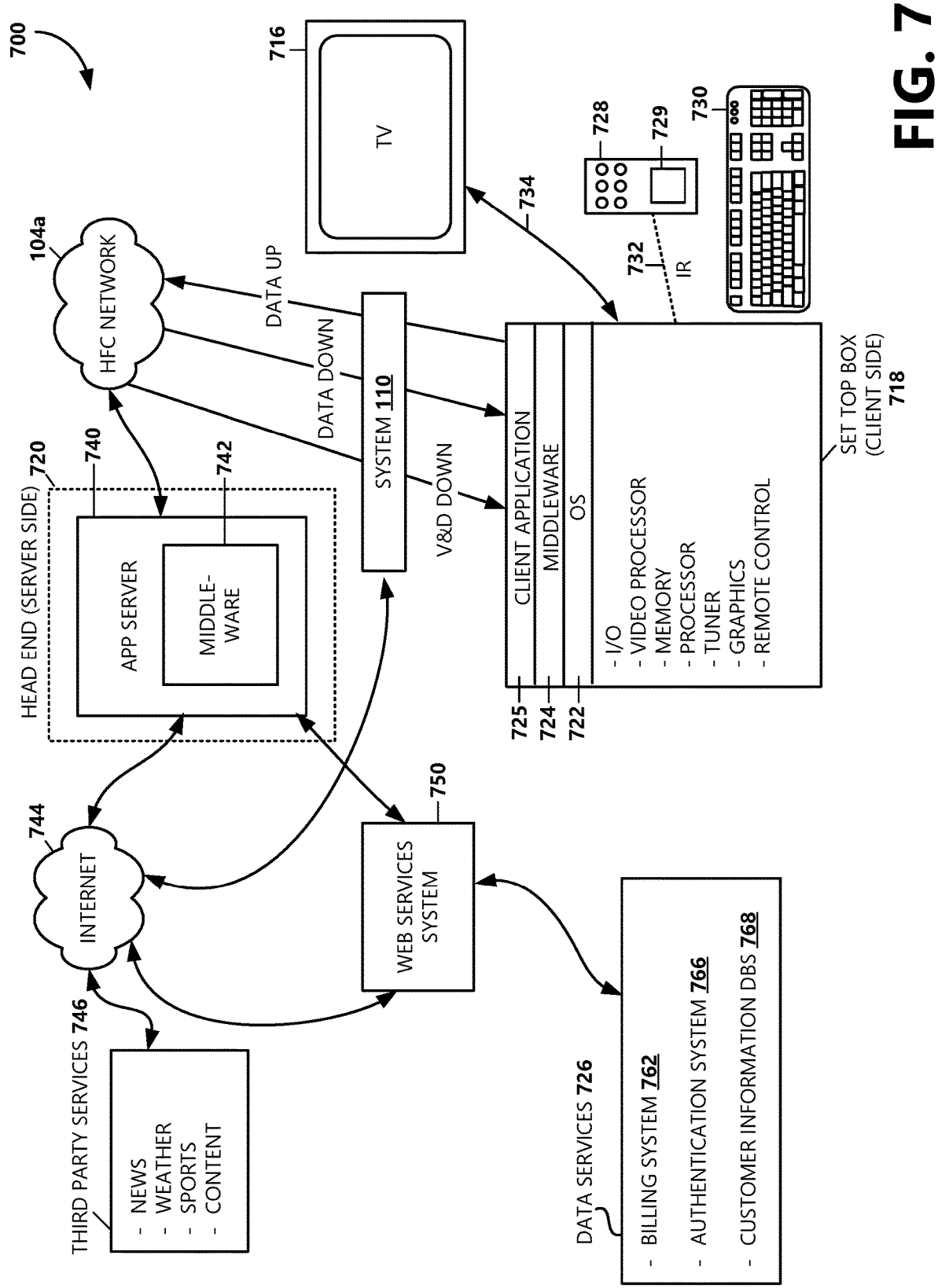
FIG. 7 is a block diagram illustrating components of a cable services system architecture providing an example operating environment according to aspects of the present disclosure.

FIG. 7 is a block diagram illustrating a cable television services system 700 (hereafter referred to as "CATV") architecture providing an operating environment according to an aspect. According to aspects, the service provider 124 may operate in the form of a CATV 700 as illustrated and described in FIG. 7. As should be appreciated, a CATV services system 700 is but one of various types of systems that can be utilized for providing an operating environment for providing supplemental content functionality described herein. Referring now to FIG. 7, digital and analog video programming, information content and interactive television services are provided via a HFC network 702 to a television set 716 for consumption by a cable television/services system customer. As is known to those skilled in the art, HFC networks 702 combine both fiber optic cable lines and coaxial cable lines. Typically, fiber optic cable lines run from the cable head end 720 to neighborhoods of subscribers. Coaxial cable lines run from the optical fiber feeders to each customer or subscriber.

The CATV system 700 is in the form of a distributed client-server computing system for providing video and data flow across the HFC network 702 between server-side services providers (e.g., cable television/services providers) via a server-side head end 720 and a client-side customer via a set-top box (STB) 718 functionally connected to a customer receiving device, such as the television set 716. The functionality of the HFC network 702 allows for efficient bidirectional data flow between the set-top box 718 and an application server 740 of the server-side head end 720. As is understood by those skilled in the art, modern CATV systems 700 can provide a variety of services across the HFC network 702 including traditional digital and analog video programming, telephone services, high speed Internet access, video-on-demand, and services.

On the client side of the CATV system 700, digital and analog video programming and digital and analog data are provided to the customer television set 716 via the STB 718. Interactive television services that allow a customer to input data to the CATV system 700 likewise are provided by the STB 718. As illustrated in FIG. 7, the STB 718 is a multipurpose computing device having a computer processor, memory, and an input/output mechanism. The input/output mechanism receives input from server-side processes via the HFC network 702 and from customers via input devices such as a remote control device 728, keyboard 730, or other computing device, such as a tablet/slate computer, smart phone, etc. The remote control device 728 and the keyboard 730 can communicate with the STB 718 via a suitable communication transport such as the infrared connection 732. The remote control device 728 can include a biometric input module 729. The STB 718 also includes a video processor for processing and providing digital and analog video signaling to the television set 716 via a cable communication transport 734. A multi-channel tuner is provided for processing video and data to and from the STB 718 and the server-side head end 720, described below.

The STB 718 also includes an operating system 722 for directing the functions of the STB 718 in conjunction with a variety of client applications 725. For example, if a client application 725 requires a news flash from a third-party news source to be displayed on the television 716, the operating system 722 can cause the graphics functionality and video processor of the STB 718, for example, to output the news flash to the television 716 at the direction of the client application 725 responsible for displaying news items.

Because a variety of different operating systems 722 can be utilized by a variety of different brands and types of set-top boxes 718, a middleware layer 724 can be provided to allow a given software application to be executed by a variety of different operating systems. According to an embodiment, the middleware layer 724 can include a set of application programming interfaces (APIs) that are exposed to client applications and operating systems 722 that allow client applications 725 to communicate with the operating systems 722 through common data calls understood via the API set. As described below, a corresponding middleware layer 742 is included on the server side of the CATV system 700 for facilitating communication between the server-side application server and the client-side STB 718. The middleware layer 742 of the server-side application server and the middleware layer 724 of the client-side STB 718 can format data passed between the client side and server side according to the Extensible Markup Language (XML).

According to one aspect, the STB 718 passes digital and analog video and data signaling to the television 716 via a one-way communication transport 734. According to other aspects, two-way communication transports can be utilized, for example, via high definition multimedia (HDMI) ports. The STB 718 can receive video and data from the server side of the CATV system 700 via the HFC network 702 through a video/data downlink and data via a data downlink. The STB 718 can transmit data from the client side of the CATV system 700 to the server side of the CATV system 700 via the HFC network 702 via one data uplink. The video/data downlink is an "in band" downlink that allows for digital and analog video and data signaling from the server side of the CATV system 700 through the HFC network 702 to the STB 718 for use by the STB 718 and for distribution to the television set 716. As is understood by those skilled in the art, the "in band" signaling space operates at a relative high frequency, e.g., between 54 and 1000 megahertz. The signaling space is generally divided into 6 megahertz channels in which can be transmitted as a single analog signal or a greater number (e.g., ten) of digital signals.

The data downlink and the data uplink, illustrated in FIG. 7, between the HFC network 702 and the set-top box 718 comprise "out of band" data links. As is understand by those skilled in the art, the "out of band" frequency range is generally at a lower frequency than "in band" signaling. For example, the "out of band" frequency range can be between zero and 54 megahertz. Data flow between the STB 718 and the server-side application server 740 is typically passed through the "out of band" data links. Alternatively, an "in band" data carousel can be positioned in an "in band" channel into which a data feed can be processed from the application server 740 through the HFC network 702 to the STB 718. Operation of data transport between components of the CATV system 700, described with reference to FIG. 7, is well known to those skilled in the art.

Referring still to FIG. 7, the head end 720 of the CATV system 700 is positioned on the server side of the CATV system and includes hardware and software systems responsible for originating and managing content for distributing through the HFC network 702 to client-side STBs 718 for presentation to customers. As described above, a number of services can be provided by the CATV system 700, including digital and analog video programming, interactive television services, telephone services, video-on-demand services, targeted advertising, and/or provision of supplemental content.

The application server 740 can be configured as a computing system operative to assemble and manage data sent to and received from the STB 718 via the HFC network 702. As described above, the application server 740 includes a middleware layer 742 for processing and preparing data from the head end 720 of the CATV system 700 for receipt and use by the client-side STB 718. For example, the application server 740 via the middleware layer 742 can obtain supplemental content from third-party services 746 via the Internet 744 for transmitting to a customer through the HFC network 702, the STB 718, and recording by a local or remote DVR. For example, content metadata from a third-party content provider service can be downloaded by the application server 740 via the Internet 744. When the application server 740 receives the downloaded content metadata, the middleware layer 742 can be utilized to format the content metadata for receipt and use by the STB 718. Therefore, content metadata can be sent and categorized based on the availability to the customer's program guide data.

According to one embodiment, data obtained and managed by the middleware layer 742 of the application server 740 is formatted according to the Extensible Markup Language and is passed to the STB 718 through the HFC network 702 where the XML-formatted data can be utilized by a client application 725 in concert with the middleware layer 724, as described above. As should be appreciated by those skilled in the art, a variety of third-party services data 746, including news data, weather data, sports data and other information content can be obtained by the application server 740 via distributed computing environments such as the Internet 744 for provision to customers via the HFC network 702 and the STB 718. Additionally, the application server 740 may receive data via the Internet 744.

According to aspects, the application server 740 obtains customer support services data, including billing data, information on customer work order status, answers to frequently asked questions, services provider contact information, and the like from data services 726 for provision to the customer via an interactive television session. The data services 726 include a number of services operated by the services provider of the CATV system 700 which can include profile and other data associated with a given customer.

A billing system 762 can include information such as a customer's name, street address, business identification number, Social Security number, credit history, and information regarding services and products subscribed to by the customer. According to embodiments, the billing system 762 can also include billing data for services and products subscribed to by the customer for bill processing, billing presentment and payment receipt. An authentication system 766 can include information such as secure user names, subscriber profiles, subscriber IDs, and passwords utilized by customers for access to network services. A customer information database 768 can include general information about customers such as place of employment, business address, business telephone number, and demographic information such as age, gender, educational level, and the like. The customer information database 768 can also include information on pending work orders for services or products ordered by the customer. The customer information database 768 can also include general customer information such as answers to frequently asked customer questions and contact information for various service provider offices/departments. As should be understood, this information can be stored in a variety of disparate databases operated by the cable services provider.

Referring still to FIG. 7, web services system 750 is illustrated between the application server 740 and the data services 726. According to aspects, web services system 750 serves as a collection point for data requested from each of the disparate data services systems comprising the data services 726. According to aspects, when the application server 740 requires customer services data from one or more of the data services 726, the application server 740 passes a data query to the web services system 750. The web services system 750 formulates a data query to each of the available data services systems for obtaining any required data for a requesting customer as identified by a set-top box identification associated with the customer. The web services system 750 serves as an abstraction layer between the various data services systems and the application server 740. That is, the application server 740 is not required to communicate with the disparate data services systems, nor is the application server 740 required to understand the data structures or data types utilized by the disparate data services systems. The web services system 750 is operative to communicate with each of the disparate data services systems for obtaining necessary customer data. The customer data obtained by the web services system is assembled and is returned to the application server 740 for ultimate processing via the middleware layer 742, as described above. As should be understood by those skilled in the art, the disparate systems 750, 762, 766, 768 can be integrated or provided in any combination of separate systems, wherein FIG. 7 shows only one example.

Aspects, for example, are described above with reference to block diagrams and/or operational illustrations of methods, systems, and computer program products according to embodiments. The functions/acts noted in the blocks can occur out of the order as shown in any flowchart or described herein. For example, two processes shown or described in succession can in fact be executed substantially concurrently or the blocks can sometimes be executed in the reverse order, depending upon the functionality/acts involved.

While certain embodiments have been described, other embodiments may exist. Furthermore, although embodiments have been described as being associated with data stored in memory and other storage mediums, data may also be stored on or read from other types of computer-readable storage media. Further, the disclosed processes may be modified in any manner, including by reordering and/or inserting or deleting a step or process, without departing from the embodiments.

The foregoing description has been presented for the purposes of illustration and description. It is not intended to be exhaustive or to limit the embodiments to the precise forms disclosed. Many modifications and variations are possible in light of the above teaching. It is intended that the scope of the invention be limited not with this detailed description, but rather by the claims appended hereto.

We claim:

1. A network connecting device, comprising:
   at least one processor;
   a memory coupled to the at least one processor, the memory including instructions that when executed by the at least one processor operate to:
   access master configuration settings comprising an optimized sequence of network connectivity evaluations for discovering a Wide Area Network (WAN) access channel, wherein the optimized sequence is determined by a machine learning engine and optimized to minimize a setup time of the network connecting device;
   perform the network connectivity evaluations included in the optimized sequence until a successful WAN access channel is determined to provide connectivity to a network service provider access network including:
   a first network connectivity evaluation that includes an evaluation of an Ethernet link; and
   a second network connectivity evaluation that includes an evaluation of a Data Over Cable Service Interface Specification (DOCSIS) link;
   implement the successful WAN access channel;
   store the successful WAN access channel in non-volatile storage as a last-known-good operating mode; and
   provide network connectivity data associated with the network connecting device to the machine learning engine.

2. The network connecting device of claim 1, further operative to:
   receive an updated optimized sequence determined by the machine learning engine based on the network connectivity data; and
   overwrite the master configuration settings with the updated optimized sequence.

3. The network connecting device of claim 1, wherein:
   the first-network connectivity evaluation is associated with a first WAN access channel; and
   the first network connectivity evaluation is associated with one or a combination of:
   a fastest WAN access channel scan time; and
   a highest connection success rate.

4. The network connecting device of claim 1 configured to connect to the network service provider access network via at least two of:
   a DOCSIS WAN access channel;
   a Direct Subscriber Line (DSL) WAN access channel;
   an Ethernet Wide Area Network (EWAN) WAN access channel;
   an Optical Network Terminal (ONT) WAN access channel;
   a Long Term Evolution (LTE) WAN access channel;
   a coaxial WAN access channel, and
   an IEEE 802.11 WAN access channel.

5. The network connecting device of claim 1, further operative to:
   determine that a link to an associated WAN access channel is up;
   enable an operating mode of the associated WAN access channel;
   acquire an Internet Protocol (IP) address via the associated WAN access channel;
   attempt to connect to a test server via the acquired IP address; and when a determination is made that a successful communication is established with the test server, determine that the associated WAN access channel is successful.

6. The network connecting device of claim 5, wherein when a determination is made of an unsuccessful communication with the test server after acquiring the IP address, the network connecting device performs a next network connectivity evaluation included in the optimized sequence to determine whether a next WAN access channel provides connectivity to the access network.

7. The network connecting device of claim 6, wherein the determination of the unsuccessful communication with the test server is based on receiving an indication of one of:
   a Domain Name System error;
   a HyperText Transfer Protocol 404 error;
   a timeout has occurred; or
   a retry limit has been reached.

8. The network connecting device of claim 1, further operative to:
   receive optimized connectivity settings including instructions associated with controlling routing and prioritizing traffic using a plurality of WAN access channels, wherein the optimized connectivity settings are configured to:
   optimize network performance or enforce business rules;
   store the optimized connectivity settings in non-volatile storage; and
   implement the optimized connectivity settings.

9. A system for providing optimized access network connectivity, comprising:
   at least one processor;
   a memory coupled to the at least one processor, the memory including instructions that when executed by the at least one processor cause the system to be configured to:
   collect WAN access channel setup and connectivity information associated with a plurality of network connecting devices;
   use machine learning to learn connecting and usage behaviors associated with the network connecting devices;
   determine, using the learned connecting and usage behaviors, an optimized access network setup process including an optimized sequence of network connectivity evaluations for discovering one or more WAN access channels, wherein the optimized sequence of network connectivity evaluations is configured to minimize a setup time of at least one network connecting device and includes:
      a first network connectivity evaluation that includes an evaluation of an Ethernet link; and
      a second network connectivity evaluation that includes an evaluation of a DOCSIS link; and
   provide the optimized access network setup process to the at least one network connecting device of the plurality of network connecting devices for storage in non-volatile memory.

10. The system of claim 9, wherein the network connectivity evaluations include an evaluation of at least two of:
    a DOCSIS WAN access channel;
    a DSL WAN access channel;
    an EWAN WAN access channel;
    an ONT WAN access channel;
    an LTE WAN access channel;
    a coaxial WAN access channel, and
    an IEEE 802.11 WAN access channel.

11. The system of claim 9, wherein the optimized access network setup process comprises instructions for the at least one network connecting device to:
    perform the network connectivity evaluations included in the optimized sequence until a successful WAN access channel is determined to provide connectivity to a network service provider access network;
    implement the successful WAN access channel;
    store the successful WAN access channel in non-volatile storage as a last-known-good operating mode; and
    provide network connectivity data associated with the at least one network connecting device to the machine learning engine.

12. The system of claim 9, wherein the first network connectivity evaluation includes:
    a step to determine whether a link to a first WAN access channel is up;
    a step to, when the link to the first WAN access channel is up, enable an operating mode of the first WAN access channel;
    a step to acquire an Internet Protocol (IP) address via the first WAN access channel;
    a step to attempt to establish communications with a test server via the acquired IP address; and
    a step to, when a determination is made that successful communications are established with the test server, determine that the first WAN access channel is successful.

13. The system of claim 12, wherein the first network connectivity evaluation further includes an evaluation of a WAN access channel associated with a fastest WAN access channel scan time.

14. The system of claim 12, wherein the first network connectivity evaluation further includes:
    a step to make a determination of an unsuccessful connection to the test server after acquiring the IP address; and
    perform a next network connectivity evaluation included in the optimized sequence to determine whether a next WAN access channel provides connectivity to the access network.

15. The system of claim 14, wherein
    the first WAN access channel is the Ethernet link.

16. The system of claim 14, wherein the determination of the unsuccessful connection to the test server is based on receiving an indication of one of:
    a Domain Name System error;
    a HyperText Transfer Protocol 404 error;
    a timeout has occurred; or
    a retry limit has been reached.

17. The system of claim 9, further operative to determine optimized connectivity settings for the at least one network connecting device of the plurality of network connecting devices, wherein the optimized connectivity settings include instructions associated with controlling routing and prioritizing traffic using a plurality of WAN access channels, wherein the optimized connectivity settings are configured to:
    optimize network performance; or
    enforce business rules.

18. A method for providing optimized access network connectivity, comprising:
    accessing master configuration settings comprising an optimized sequence of network connectivity evaluations for discovering a WAN access channel, wherein the optimized sequence is determined by a machine learning engine and optimized to minimize a setup time of a network connecting device;
performing the network connectivity evaluations included in the optimized sequence until a successful WAN access channel is determined to provide connectivity to a network service provider access network including:
   a first network connectivity evaluation that includes an evaluation of an Ethernet link; and
   a second network connectivity evaluation that includes an evaluation of a DOCSIS link;
implementing the successful WAN access channel;
storing the successful WAN access channel in non-volatile storage as a last-known-good operating mode; and
providing network connectivity data associated with the network connecting device to the machine learning engine.

19. The method of claim 18, further comprising:
receiving an updated optimized sequence determined by the machine learning engine based on the network connectivity data; and
overwriting the master configuration settings with the updated optimized sequence.

\* \* \* \* \*